(No Model.) 2 Sheets—Sheet 2.
J. G. RINGER.
SEED PLANTER AND FERTILIZER DISTRIBUTER.
No. 291,402. Patented Jan. 1, 1884.
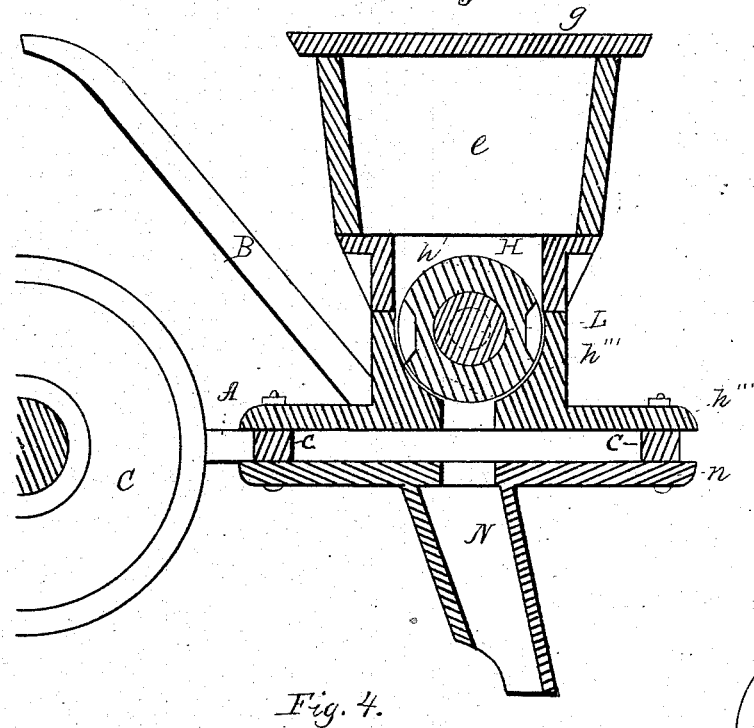
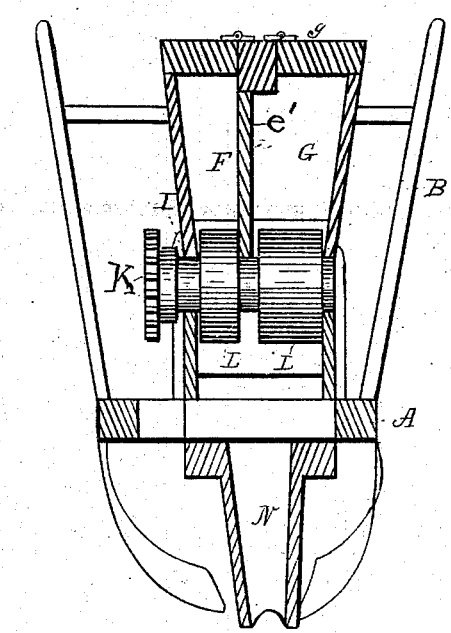
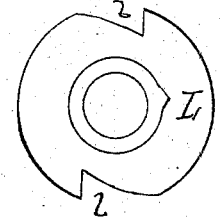
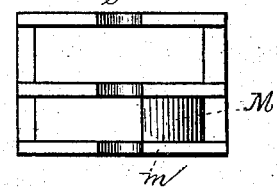
WITNESSES
Amelia Keyser
Philip Celfiasi.
INVENTOR
J. G. Ringer
by Anderson & Smith
his ATTORNEYS

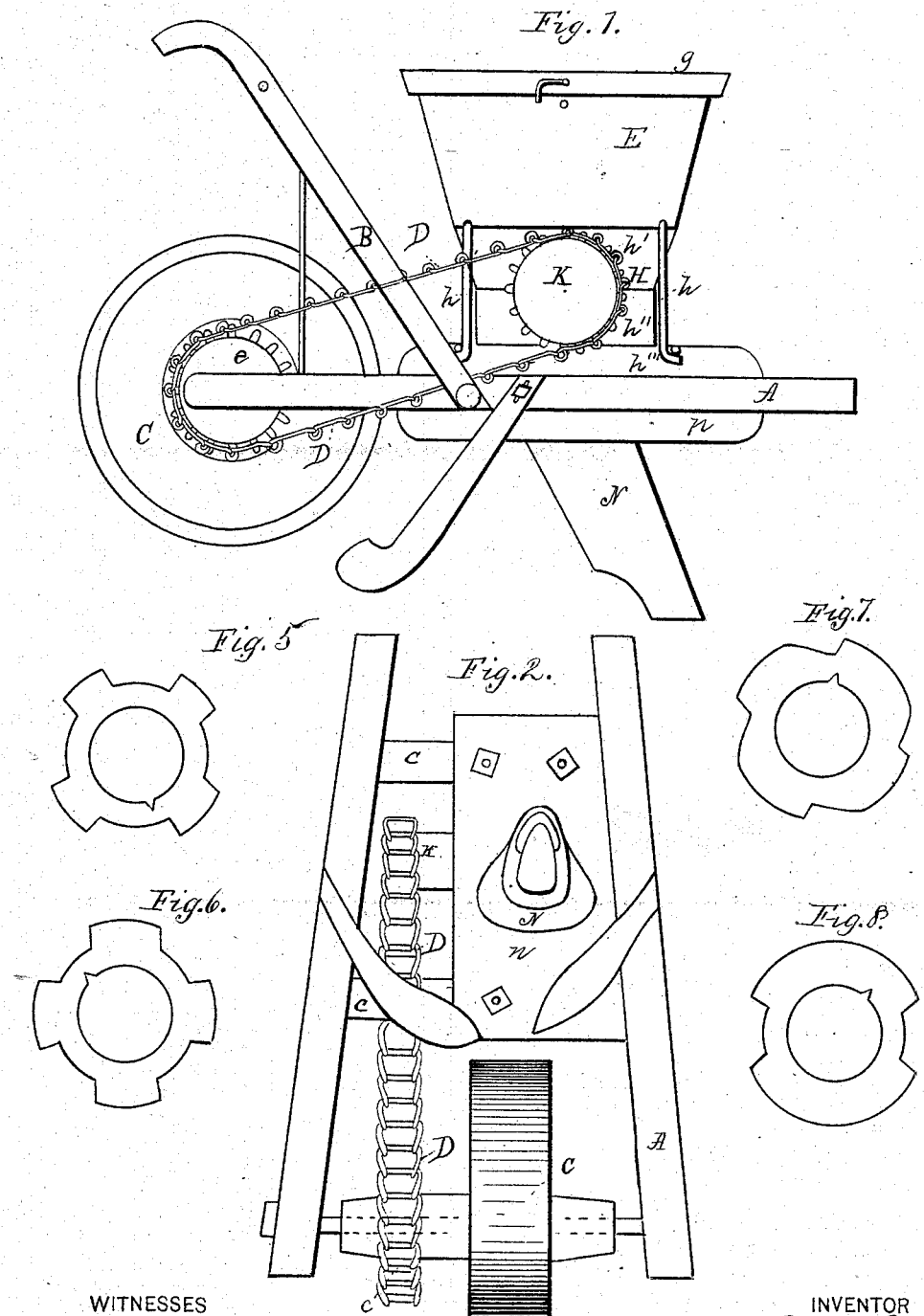

UNITED STATES PATENT OFFICE.

JOSEPH G. RINGER, OF OAKLAND CROSS-ROADS, PENNSYLVANIA.

SEED-PLANTER AND FERTILIZER-DISTRIBUTER.

SPECIFICATION forming part of Letters Patent No. 291,402, dated January 1, 1884.

Application filed July 1, 1882. (No model.)

*To all whom it may concern:*

Be it known that I, JOSEPH G. RINGER, a citizen of the United States, residing at Oakland Cross-Roads, in the county of Westmoreland and State of Pennsylvania, have invented certain new and useful Improvements in Seed-Planters and Fertilizer-Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a side elevation. Fig. 2 is a plan view. Fig. 3 is a vertical longitudinal sectional view. Fig. 4 is a transverse vertical section. Figs. 5, 6, 7, 8, 9, and 10 are details.

This invention has relation to seed-planters and fertilizer-distributers; and it consists in the construction and novel arrangement of parts, as will be hereinafter fully described and particularly claimed.

The main frame comprises two horizontal side bars, A, which converge toward their forward ends, at the terminals of which they are suitably connected.

B indicates the handles secured to the side bars, and $c$ the horizontal cross-bars which connect the side bars with each other, and which provide supports for the seed and fertilizer box. The frame is supported upon a wheel, C, located between the rear ends of the side bars, and having upon its hub a sprocket-wheel, $e$, for the chain D, which is employed for driving the feed-shaft.

The hopper E is divided by a vertical partition, $e'$, into two compartments, F and G, the one being for seed and the other for fertilizing material. These compartments are each closed at the top by a door, $g$, so that by employing two doors either one can be opened, and thereby the compartments filled separately. The hopper is detachably secured upon a seed-box, H, by means of rods $h$, whereby it can be detached when required; or, if preferred, the hopper can be permanently secured upon the upper part of the seed-box, which latter is by preference made of metal, and the hopper constructed of wood.

The seed-box is composed of two parts, $h'$ $h^2$, which are fitted together and held in place by means of the said rods $h$, which are secured or detachably connected at their lower ends to the base-flange of the lower part of the seed-box, and at their upper ends either permanently or detachably connected with the upper part of the seed-box, or with the hopper, or with both the seed-box and the hopper. The base-flanges $h^3$ of the seed-box are secured upon the cross-bars of the main frame, and can be detached therefrom when it is desired to remove the hopper and seed-box.

The feed-shaft I has its bearings in the meeting edges of the two parts of the seed-box, so that by separating said parts the shaft can be removed. The feed-shaft carries a sprocket-wheel, K, for the endless driving-chain, and it also carries two feed-wheels, L, one for each compartment in the hopper. The feed-wheels are keyed on the rotary shaft, so that they can be detached therefrom when it becomes necessary to change the wheels. These wheels are each formed with a peripheral series of longitudinal recesses, $l$, the side walls of which are beveled, so that the depth of the recess can be varied by fitting into the same a suitable block or strip. The wheel at the bottom of the fertilizer-compartment feeds the material down into the spout, while the feed or seeding wheel feeds the corn or seed from the seed-compartment into the same spout in a like manner.

M indicates a rubber or other elastic block fixed within the seed-compartment, and having its concaved side $m$ alongside of the seeding-wheel. This block prevents the corn or other seed from being broken or cut as it is carried from the compartment by the wheel.

The spout N depends from a plate or board, $n$, which is secured to the cross-bars of the main frame, the spout being in position to receive either the fertilizing material or the seed from the feed-wheels.

The hopper, seed-box, spout, and feed-shaft are all detachable from the main frame, which latter is provided with the usual devices belonging to a cultivator.

Having thus described my invention, what I claim is—

The combination, with the feed-shaft I, having bearings in the meeting edges of the two parts of the seed and fertilizing box, of the removable feed-wheels having longitudinal recesses extending throughout the length of said wheels, and provided with beveled edges adapted to receive strips of wood for varying their depth to regulate the amount of material discharged, and the rubber block M, having its concave edge above the periphery of the seed-wheel, substantially as specified.

In testimony whereof I affix my signature in presence of two witnesses.

JOSEPH G. RINGER.

Witnesses:
J. C. METZGAR,
H. L. METZGAR.